United States Patent [19]

Nevarez

[11] Patent Number: 5,628,007

[45] Date of Patent: May 6, 1997

[54] METHODS FOR STORING A DATABASE IN EXTENDED ATTRIBUTES OF A FILE SYSTEM

[75] Inventor: Carlos A. Nevarez, Orem, Utah

[73] Assignee: Novell, Inc., Orem, Utah

[21] Appl. No.: 489,128

[22] Filed: Jun. 9, 1995

Related U.S. Application Data

[63] Continuation-in-part of Ser. No. 165,971, Dec. 10, 1993, Pat. No. 5,499,358.

[51] Int. Cl.$^6$ .................................................. G06F 17/30
[52] U.S. Cl. ..................... 395/612; 364/DIG. 1; 364/282.1; 364/282.3; 395/613
[58] Field of Search ..................... 395/600; 364/419.19

[56] References Cited

U.S. PATENT DOCUMENTS

| | | | |
|---|---|---|---|
| 5,047,918 | 9/1991 | Schwartz et al. | 395/600 |
| 5,113,519 | 5/1992 | Johnson et al. | 395/600 |
| 5,218,696 | 6/1993 | Baird et al. | 395/600 |
| 5,367,671 | 11/1994 | Feigenbaum et al. | 395/600 |
| 5,371,885 | 12/1994 | Letwin | 395/600 |
| 5,412,808 | 5/1995 | Bauer | 395/600 |
| 5,499,358 | 3/1996 | Nevarez | 395/600 |

*Primary Examiner*—Paul V. Kulik
*Attorney, Agent, or Firm*—Snell & Wilmer

[57] ABSTRACT

The present invention provides a definition, format, and structure of extended attributes for managing, maintaining, and controlling file systems. This is accomplished by creating a database containing management, maintenance, control, and other user-defined data that are associated with a directory entry of the file system. The database is stored inside the extended attribute or sets of extended attributes. According to the present invention, each extended attribute includes a header for defining the extended attribute that comprises a first plurality of fields. It also includes a plurality of records for storing data. In turn, each record of the plurality of records comprises a second plurality of fields. The extended attribute is identified by a string stored in a directory entry of a directory entry table for the file system. The string comprises a predetermined substring denoting the extended attribute having the database architecture of the present invention. The first plurality of fields of the extended attribute includes fields for storing a length of the header, a version number of the header, a revision number of the header, the number of extended attributes in the database, and the number of records in the plurality of records in the database. The second plurality of fields includes fields for storing a name of a record, data, a record length, a length of the record name, and a length of the data. Both the name and data are stored as strings.

13 Claims, 4 Drawing Sheets

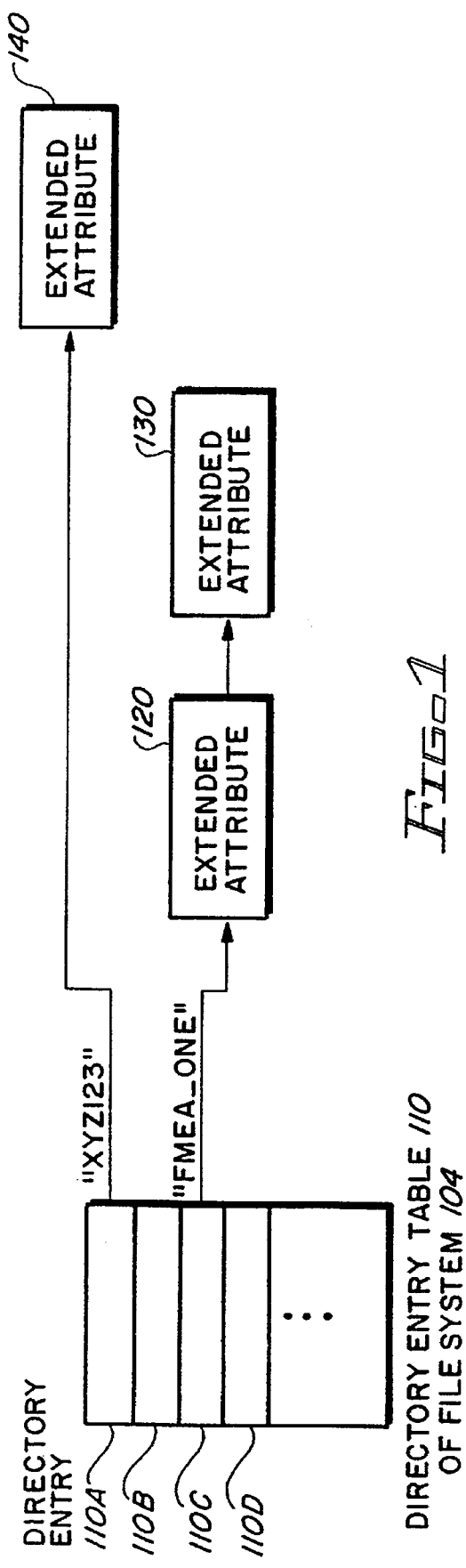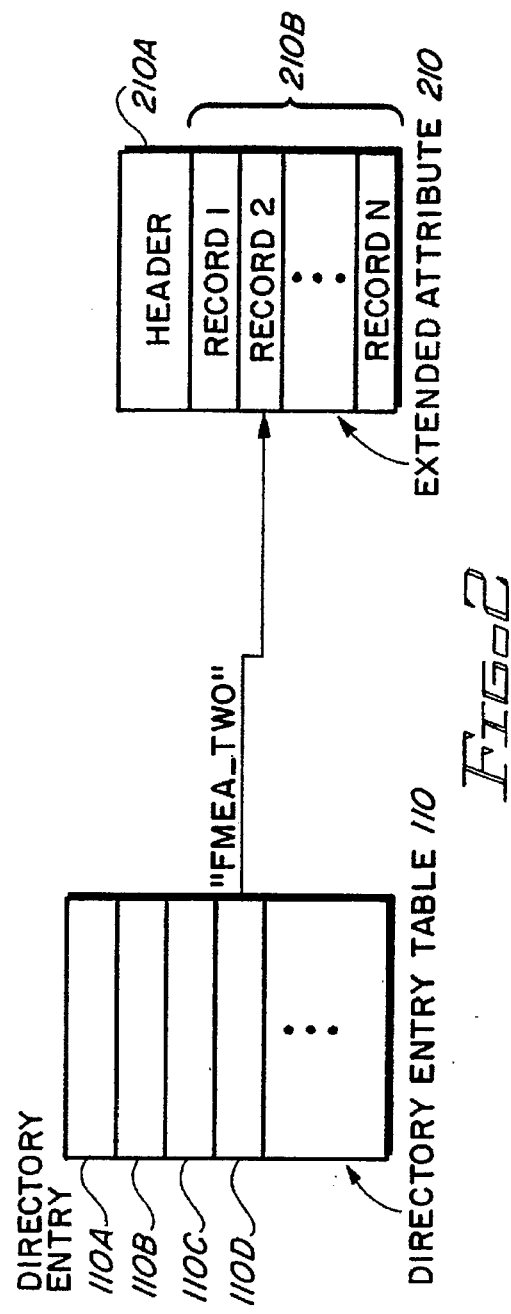

| | | | | | |
|---|---|---|---|---|---|
| 110A → | FN1 | SA1 | FC1 | EA1 | ... |
| 110B → | FN2 | SA2 | FC2 | ... | |
| 110C → | FN3 | SA3 | FC3 | EA3 | ... |
| 110D → | FN4 | SA4 | FC4 | EA4 | ... |
| 110E → | FN5 | SA5 | FC5 | EA5 | ... |
| 110F → | FN6 | SA6 | FC6 | EA6 | ... |

METHODS FOR STORING A DATABASE IN EXTENDED ATTRIBUTES OF A FILE SYSTEM

CROSS REFERENCE TO RELATED APPLICATION

This is a continuation-in-part application of U.S. Ser. No. 08/165,971, filed Dec. 10, 1993, now U.S. Pat. No. 5,499,358, the contents of which are hereby incorporated by reference.

TECHNICAL FIELD

The present invention relates, generally, to computer data file storage systems which support extended attributes and, more particularly, to an extended attribute architecture which includes an embedded file maintenance database within the extended attribute structure.

BACKGROUND ART AND TECHNICAL PROBLEMS

Computer operating systems such as DOS and OS/2, and more particularly the mechanisms for creating, storing, and retrieving data files and directories associated with the operating systems, are generally well known. Mature and powerful file storage systems have evolved which allow the application programmer to focus on the functionality of the application program, leaving to the operating system the tasks of creating files and directories, allocating disk space (whether local storage or remote file server storage), and file retrieval schemes largely to the operating system. Indeed, many sophisticated application programs, tools, and the like simply implement a function call (or a "request") to the operating system which is transparent to the user, whereupon the operating system implements the tasks of file creation, storage, retrieval, and the like.

For example, in response to a function call from an application, an operating system may retrieve data (whether text, graphics, video, or the like) from memory and create a file for that data, storing the data at a specific location within the data storage unit (e.g., hard drive, file server). In addition, the operating system typically stores along with the file a set of information known as standard attributes. Common standard attribute sets for a data file often include attributes such as the file name, the date and time of most recent access to the file as well as the date and time of the last revision, security (which identifies those users authorized to access the file), and the like. As application and other programs have become more complex, the operating system is required to track information or attributes relating to a file in addition to the standard attributes. Thus, the need for managing such extended attributes for files, directories, and the like has arisen. Although it is theoretically possible to simply expand the list of standard attributes to include these extended attributes, many extended attributes are unique to a very narrow application program and, hence, to expand the list of standard attributes to include all extended attributes from all applications would unnecessarily increase the size and complexity of standard attribute sets.

Storage of files and their associated standard attributes is generally managed by operating systems in a linked manner, i.e., as though both the file and standard attribute set were a single entity, even though they may be stored at different locations in storage. For a more comprehensive discussion of file storage, see Feigenbaum, et al., U.S. Pat. No. 5,367,671 issued Nov. 22, 1994, Baird, et al., U.S. Pat. No. 5,218,696 issued Jun. 8, 1993, and Johnson, et al., U.S. Pat. No. 5,113,519 issued May 12, 1992, the entire disclosures of which are hereby incorporated herein by this reference.

One advantage associated with extended attributes surrounds the fact that, in many instances, an extended attribute is treated by the data storage and retrieval system as being different from a file. In particular, a file is typically assigned a file name, whereupon the file name is typically cataloged in a directory along with other information relating to the file, for example indicia of the storage location of the standard attributes associated with the file, the storage location of any extended attributes which may be associated with the file, and the storage location of the actual data within the file (or at least the location in storage of the first data cluster for the file, which first data cluster directs the operating system to subsequent data clusters within which the data pertaining to the file are stored).

An extended attribute, on the other hand, typically does not require a separate entry in a directory, but rather may simply be logically linked to the file name, for example through a logical link created by the application or operating system which governs the creation of the extended attribute. In one sense, an extended attribute is simply a shorthand way of associating additional information with the file in a convenient and efficient manner. This shortcut approach is attractive to application developers since it conserves processing time, disk space, and the like.

The application programmer is thus afforded a great deal of flexibility in designing and implementing extended attributes associated with a file. Indeed, it is this flexibility, in concert with the application's specific extended attribute scheme created in the context of a particular application or operating system, which contributes to the non-interchangeability of extended attributes across operating systems or among different (distinguishable) applications.

Two principle schemes have evolved in the prior art for managing extended attributes. In the first scheme, the operating system creates a standard file which includes the data associated with the file as well as the standard attributes for that file. The operating system further creates a second file within which the extended attribute information is stored. The relationship and, hence, the logical link, between a standard file and the extended attribute file is maintained by the application. However, when the file is subsequently accessed by a different application, tool, or the like, the "link" between the standard file and the extended attribute file is lost, such that the extended attribute information is typically irretrievable by an application other than that which created the original file and its extended attribute file.

In the second scheme, the extended attributes are appended to the standard file, for example at the beginning of the file or at the end of the file, whereby the application which created the extended attributes "remembers" which storage sectors embody the information pertaining to the data file and its standard attributes, and which sectors of storage are reserved for the extended attribute information. Again, when the file is subsequently retrieved by a different application, only the file information and standard attributes are typically accessible.

Feigenbaum, et al. discloses a methodology for allocating and conjointly managing access to storage for a file and its associated extended attributes. In particular, a single directory listing is made for the file which includes the file name, indicia of the file's location in storage, and indicia of the location in storage of an extended attribute associated with the file.

The Feigenbaum, et al. scheme permits additional extended attributes to be created for the same base file, whereupon an additional notation is made as to the location in storage of the subsequent extended attributes. Thus, when the application which created the file and extended attributes subsequently retrieves that file, all extended attributes associated with that file which were created by the same application may also be accessed, if desired. However, if additional extended attributes are created for an existing file through an application other than the application which created the original main file and/or the original extended attributes, the subsequent application is incapable of accessing the original extended attributes created by the first application.

A system and method for managing extended attributes which are created and accessed by different or distinguishable operating systems, applications, and the like, is needed which overcomes the shortcomings of the prior art. In particular, a system is needed which includes an architecture for extended attributes for providing improved file system management, maintenance, and control by creating and storing a database inside the extended attribute structures.

SUMMARY OF THE INVENTION

The present invention provides systems and methods for overcoming many of the shortcomings associated with the prior art. In accordance with one aspect of the present invention, an architecture for managing extended attributes provides a definition, format, and structure of extended attributes which facilitates the management, maintenance, and control of file systems. In a preferred embodiment, this is accomplished by creating a database within an extended attribute structure, which database embodies management, maintenance, control, and perhaps other features associated with a particular directory entry of the file system.

In accordance with a further aspect of the present invention, one or more extended attribute structures may be created for each data entry in a directory. Each of the extended attribute structures is referenced within the file name space for each directory entry (DE), and each extended attribute structure has associated therewith a name which is constructed in accordance with a predetermined convention, such that the various extended attribute structures associated with a particular data entry may be retrieved or accessed by any operating system or application, even if the extended attribute structure was created by a different application, operating system, or the like.

In accordance with a further aspect of the present invention, each extended attribute structure includes a header portion having a first plurality of fields associated with the header, as well as a record portion which includes a plurality of records for storing data relating to the extended attributes. In turn, each record includes a plurality of fields which more particularly set forth information pertaining to each record.

In accordance with yet a further aspect of the present invention, the header portion of each extended attribute structure includes information pertaining to the number of extended attribute structures associated with the particular data entry, as well as the number of records associated with each extended attribute structure.

In accordance with yet a further aspect of the present invention, each record within a particular extended attribute structure includes respective fields relating to, among other things, the name of the record, as well as the data relating to that particular record.

In accordance with a further aspect of the present invention, extended attribute structures which conform to the architecture of the present invention may be utilized by operating systems and other applications which are also compliant with the subject architecture, even though the various extended attribute structures may have been created by an application or operating system which is distinguishable from (i.e., developed by different vendors) the one currently accessing the extended attribute information. This is particularly useful from the perspective of a system administrator or MIS director who desires to obtain summary data for various directories, even though many of the files identified in the directories were created by a wide variety of applications. By providing a universal architecture; for building extended attributes, the flexibility in creating extended attributes currently enjoyed by application programmers remains intact; in addition, by adhering to a common architecture, even very different application schemes for managing extended attributes may nonetheless be reconciled at the level of generality most needed by system administrators.

BRIEF DESCRIPTION OF THE DRAWING FIGURES

The present invention will hereinafter be described in conjunction with the appended drawing figures, wherein like numerals denote like elements, and:

FIG. 1 is a diagram illustrating a file system comprising a directory entry table and extended attributes;

FIG. 2 is a diagram illustrating an extended attribute of the present invention including a header and a set of N records;

FIG. 6 is a detailed schematic diagram of the directory entry table shown in FIG. 1.

DETAILED DESCRIPTION OF PREFERRED EXEMPLARY EMBODIMENTS

Figures 3, 4:
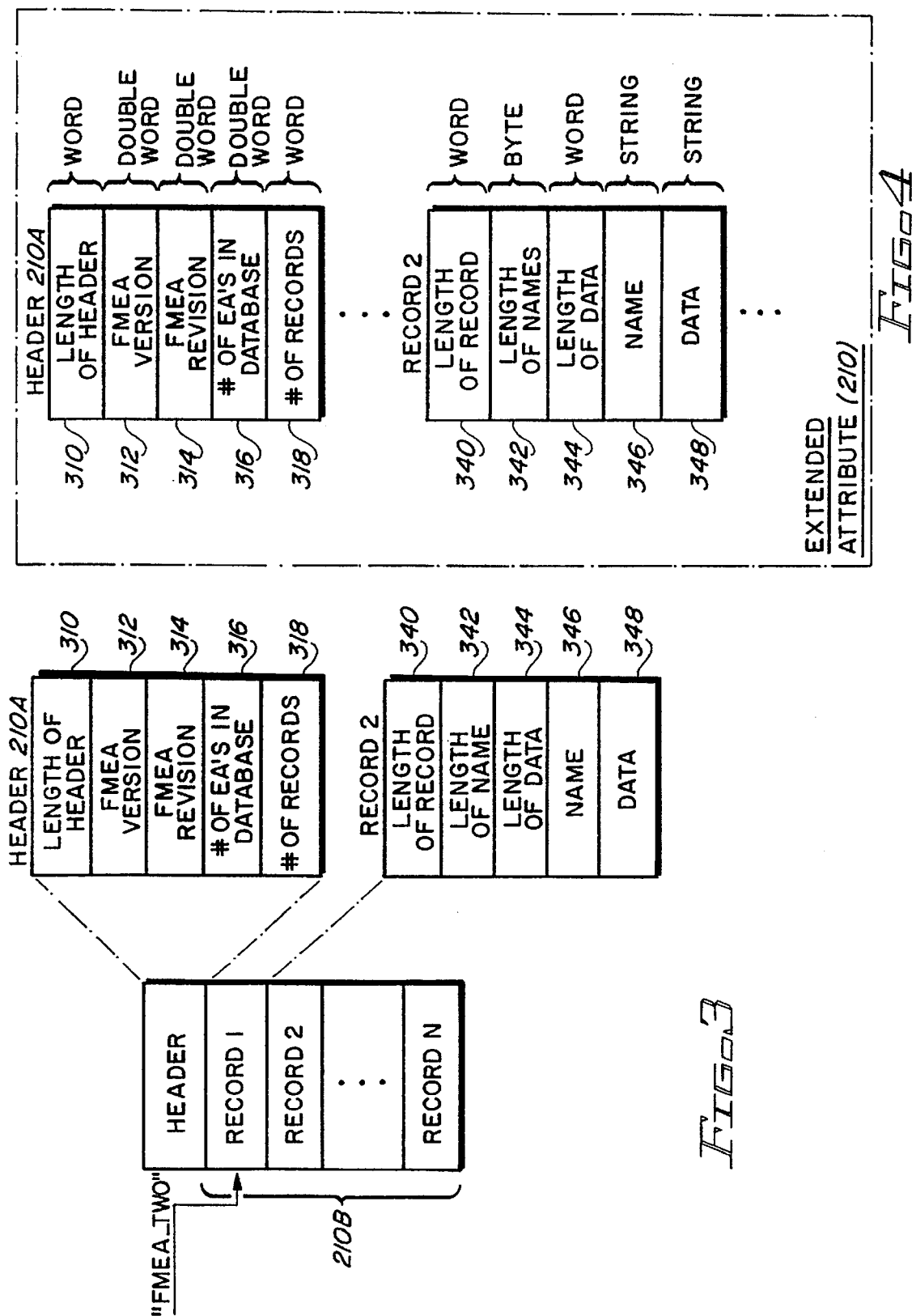
FIG. 3 is a diagram illustrating the internal format of an extended attribute of the present invention.
FIG. 4 is a diagram illustrating data types used for header fields and record fields of the extended attribute of FIG. 3; and, FIG. 5 is a flow diagram illustrating a method of searching for a directory entry (entries) that may contain an FMEA database.

Referring now to FIG. 1, an exemplary file management system 104, e.g., a Netware File System® version 3.X or greater, suitably comprises a directory entry table 110 comprising a plurality of directory entries (DE) 110A–110D. Each respective DE corresponds to a particular file, subdirectory entry, or the like, or virtually any other discrete or identifiable aggregate of data. In the context of the illustrated embodiment, each DE suitably corresponds to a particular file, and includes discrete packets of information relating to a particular file.

Of the various files represented by respective DEs in table 110, some of them may have extended attributes associated with them. Of the various extended attributes associated with the various files, some of the extended attributes are compliant with the File Management Extended Attribute scheme described herein, and hence are known as "FMEA" extended attributes, whereas other files may include one or more extended attributes which are not compliant with the architecture discussed herein.

In the context of the preferred embodiment, those extended attributes which are compliant with the architecture which is the subject of the present invention are named in accordance with a convention which requires that the extended attribute name begin with the character string "FMEA"; those extended attributes which are noncompliant with the subject architecture are named in any other manner which does not include the initial character string "FMEA". In this regard, it is understood that the particular character string "FMEA" is arbitrary, as well as the position of that character string within the name of the extended attribute structures. In the context of the present invention, the key factor surrounds the ability to have a common indicia associated with each extended attribute which is compliant with the FMEA architecture described herein, regardless of the field length, position within the field, and indeed the nature of the identifying indicia.

With momentary reference to FIG. 6, depending on the particular structure of the data entry table, each DE has associated with it a number of packets of information, including information pertaining to the file name (FN), information (e.g., pointers) pertaining to the location of the standard attributes (SA) associated with that file, information pertaining to the location of at least some of the data in the file, for example the location and storage of a first cluster (FC), as well as information pertaining to the location and storage of extended attributes associated with the file. In this regard, it is possible that some of the DEs may not have any extended attributes associated therewith, for example directory entry unit 110B.

With continued reference to FIGS. 1 and 6, DE 110A suitably has associated therewith an extended attribute 140. In accordance with one aspect of the present invention, the "EA" field corresponding to DE 110A provides information (e.g., a signature) pertaining to the location in storage of the extended attributes associated with DE 110A. Thus, the system may interrogate the particular location in storage corresponding to DE 110A which corresponds to extended attribute 140. In the illustrated embodiment, extended attribute 140 is entitled "XYZ123", indicating that it is noncompliant with the architecture of the subject invention and, hence, warrants no further discussion. As discussed above, DE 110B has no extended attributes associated with it.

DE 110C suitably has respective attributes 120 and 130 associated therewith. Accordingly, DE 110C suitably exhibits a characteristic which identifies its extended attributes as being compliant with the FMEA architecture. For example, the entry, pointer, signature, or other indicia in the "EA" column of DE 110C suitably indicates that at least some of the extended attributes associated with DE 110C are compliant with the FMEA architecture; alternatively, the information contained in the "EA" column of DE 110C may be silent with respect to the nature of the extended attributes, such that the information indicating FMEA compliance resides in storage at a location indicated by column EA of DE 110C. In any event, the system interrogates, for a particular DE, the appropriate data storage sector associated with that DE's extended attributes.

Referring now to FIGS. 2 and 3, DEs which comprise extended attributes compliant with the subject architecture are described herein as having an FMEA database associated therewith. In the preferred embodiment, each FMEA database may have one or more FMEA structures associated therewith. For purposes of illustration, an exemplary FMEA structure suitably comprises FMEA structure 210, shown in FIG. 2 as "FMEA_TWO".

FMEA structure 210 suitably comprises a header portion 210A and a record portion 210B. Record portion 210B suitably comprises one or more individual records, indicated as records 1-N in the Figure.

With specific reference to FIG. 3, header 210A suitably comprises a length of header field 310, an FMEA version field 312, and FMEA revision field 314, a "number of EA's" field 316, and a "number of records" field 318. It will be appreciated that the information set forth in header 210A is merely exemplary, and that various fields may be added, deleted, or augmented as appropriate.

Field 310 suitably sets forth the length of the header structure (e.g., invites) it may also be used to determine the offset of a first record (e.g., record 1) in FMEA 210. For example, if the total length of header 210A comprises M bytes, FMEA structure 210 may be configured such that record 1 begins at a convenient point in the data storage medium after the M byte point.

Field 312 and 314 store version and revision information, respectively, pertaining to the system software. This will assist different applications, operating systems and the like in communicating with one another and accommodating for differences in versions.

Field 316 contains the number of FMEA structures associated with a particular DE. For example, if a single structure exists for a particular DE (e.g., DE 110D), then an number 1 would appear in filed 316; if a second FMEA structure is subsequently added to the file corresponding to DE 110D, the value in field 316 would be incremented to "2". In accordance with a further aspect of the present invention, incrementing the value in field 316 suitably occurs even though FMEA structures are created for the particular DE suing different applications, tools, operating systems, or the like, and further even if the various schemes for creating the FMEA structures differ from one another, provide that they are compliant with the architecture described herein.

Field 318 relates to the number of records in record portion 210B. For example, if record portion 210B comprises N records, the number "N" appears in field 318; in accordance with the preferred embodiment, this remains true even if the FMEA database associated with DE 110D also has an additional FMEA structure having its own site of "P" records associated therewith. That is, if DE 110D has associated therewith a first FMEA structure having N records and a second FMEA structure having P records, the total number of records in the FMEA database associated with DE 110D would be N+P. Nonetheless, in accordance with the illustrated embodiment, the number "N" appears in 318 (of course, the number "P" may appear in a corresponding field of the other FMEA structure associated with DE 110D).

With continued reference to FIGS. 2 and 3, each record comprising record potion 210B suitably includes a plurality of fields., including a length of record field 340, a length of name field 342, a length of data field 344, a name field 346, and a data field 348. It will be appreciated, however, that various fields may be added, deleted, or augmented, as appropriate.

Length of record field 340 suitably specifies the length of record potion 201B (e.g., in bytes). Field 342 suitably specifies the length of the name of the particular record (which appears in name field 346). Length of data field 344 suitably comprises the length of the data which appears in field 348. Thus, field 346 contains the name of the particular record, (I.e., record number 2 in this instance), which may be fully configurable by the application programmer, configurable by the user, or compliant with predetermined standards, as appropriate.

Data field 348 suitably contains the data corresponding to record number 2, and may be analogous to information corresponding to an extended attribute. Moreover, the length of fields 346 and 348 may be liberally configurable, such that the nature and extent of the data within fields 346 and 348 may provide maximum flexibility to both the application programmer and the end user. In this way, existing extended attribute schemes may adopt the subject architecture while retaining a substantial portion of their existing approach to creating and maintaining extended attributes. For example, in many prior art systems wherein the length of the extended attribute information may be increased or otherwise amended during successive sessions, so too can the length of fields 346 and 348 to accommodate the flexibility with which programmers and users have become accustomed.

FIG. 4 is a detailed diagram illustrating specific data types used in the preferred embodiment of the present invention for fields 310–318 of a header 210A and fields 340–348 of a record for FMEA 210 of FIG. 3. In the preferred embodiment of the present invention, a byte is defined as an unsigned 8-bit integer, a word is an unsigned 16-bit integer, a word is an unsigned 32-bit integer, and a string is a sequence of bytes.

The length of a header field 310 of header 210A is a word data type allowing the header 210A to be up to 65,535 bytes long. The FMEA version and revision fields 312 and 314 are each double words (i.e., 32-bit integers). The number of FMEA's in the database field 316 is a double word allowing the database to contain up to four gigabytes (4 GB) of extended attributes. The number of records field 318 is a word allowing the extended attribute (i.e., the specific FMEA 210) to contain up to 65,535 records.

The length of record field 340 of record 2 is a word data type allowing the record to be up to 65,535 bytes long. The length of name field 342 is a byte allowing a record name 346 (string) to contain up to 255 characters. The length of data field 344 is a word permitting the data 348 (string) to contain up to 65,535 characters. As stated previously, the name field 346 and data field 348 are sequences of bytes (up to 255 and 65,535 bytes, respectively).

Referring again to FIGS. 3 and 6, it can be seen that each particular FMEA structure constructed in accordance with the present invention includes a flexible, dynamic architecture for creating, augmenting, managing, and manipulating extended attributes. This is true regardless of the particular approach taken by the application which defines the extended attributes. Accordingly, the EA database architecture of the present invention provides a generic, universal architecture which functions to reconcile the very divergent approaches currently extant in the prior art. For example, if an existing prior art EA scheme defines the various extended attributes with extended attribute names, field lengths, and the like unique to a particular application, that can be easily accommodated in the context of the present invention. Indeed, the present invention is designed to maximize flexibility, while at the same time coordinating otherwise divergent extended attribute schemes into a single architecture. In this way extended attributes which are created, modified, or the like by one application may be retrieved, augmented, or otherwise manipulated by an unrelated application, provided that both applications are compliant with the EA architecture described herein.

As discussed above, compliance with the FMEA architecture described herein still affords the programmer great flexibility in implementing an extended attribute scheme within a particular application. In particular, the programmer remains free to define the number of extended attributes (corresponding to records, for example), the names of the various extended attributes, the nature and extent of the data within each extended attribute, as well as the title of the FMEA structure, and virtually any other parameter appropriate for a particular application. In this regard, recall that the header section and the record section of the FMEA structures described herein may be augmented, as appropriate.

One of the principal advantageous flowing from the architecture scheme proposed herein surrounds the ability of a system administrator to search a directory for various files (and subdirectories) with greatly enhanced efficiency.

More particularly, in prior art systems using divergent and incompatible extended attribute schemes, a system administrator could not efficiently or conveniently search through a directory to determine common characteristics of files in the manner provided by the present invention. In particular, the present invention permits a system administrator or other similarly situated individual with sufficient security access to search the "EA" fields of each DE in the directory table, which will point to the extended attribute data associated with each DE (if any). By interrogating the extended attribute data, the system can quickly and efficiently determine which extended attributes are compliant with the FMEA architecture, and which are not, as discussed above. Upon identifying those DEs which have extended attributes associated therewith which are FMEA compliant (even though some DEs may also have associated therewith extended attributes which are non-FMEA compliant), the system can efficiently search FMEA names and record names to identify characteristics which may be common to various DE entries.

For example, the architecture of extended attributes (FMEA), as illustrated in FIGS. 1–4, may be used by tools and methods for providing access to directory entries (i.e., directory entries 110A–110D of directory entry table 110 of FIG. 1) using the record names 346 as search keys. For example, an application program may allow the file system to "tag" a directory entry 110A–110D of FIG. 1 with application types: "word processing", "spreadsheet", etc. Thus, an entire file system 104 may be searched for all files and directories (i.e., directory entries 110A–110D of a directory entry table 110) having the type "word processing". The string "word processing" is stored in the name field 346 of a record (e.g., record 2 of set 210B shown in FIGS. 2–4) in the FMEA database for the files and directories of the file system 104. This facility would allow an administrator of the file system 104 to determine storage space used by textual files in contrast to executable files, for instance. While a specific example is illustrated for finding files and directories having the type "word processing", it should be apparent to a person skilled in the art that the present invention may be used by tools and methods to accomplish the management, maintenance, and control of files and directories in a file system (e.g., the Novell Netware environment).

The present invention for providing an extended attributes architecture may be used to allow file system administrators to easily manage files and directories in a computer networking environment (e.g., the Novell Netware environment). Table 1 contains several applications of the present invention that may use Novell Netware utilities.

TABLE 1

| | |
|---|---|
| NCOPY: | Copy all files matching an FMEA record name. |
| NDIR: | Display directory information of a file matching the FMEA record name. |
| SMS: | Backup a directory entry (entries) matching the FMEA record name. |
| FILER: | Allow the creation and administration of FMEA databases and their contents. |
| FLAG: | Add record names to an FMEA database (i.e., "tag" files and/or directories with a string). |

The NCOPY utility allows all files matching an FMEA name 346 to be copied. The NDIR utility displays directory information of a file in the file system 104 that matches the FMEA record name (e.g., "word processing"). The SMS utility makes backup copies of directory entries 110A–110D that match an FMEA record name 346. The FILER utility allows the creation and administration of FMEA databases and their contents. The FLAG utility adds record names to an FMEA database. This is done by "tagging" files or directories (directory entries 110A–110D) with a string.

The present invention may be used to implement a version control system for files. Using the extended attribute architecture, the version control system is able to keep track of file information: version number of the file, the date that the file was built, the owner (or person responsible for) of the file, and an electronic footprint of the file for detecting when non-FMEA applications modify the file. Prior art version control systems are inefficient, particularly regarding the release of software files. With the FMEA architecture and file system utilities, a source code librarian may "tag" files as release files using the string "release" in the record names 346. The utility NCOPY may be used to copy all "release" files to a compact disc (CD) for storage, for example. In the prior art, this operation is done manually by copying the "release" files manually, which is slow and inefficient. Thus, the present invention provides an efficient method for copying "release" files.

The extended attribute (FMEA) architecture of the present invention allows multiple FMEA databases to be associated with a file(s). Application programs may create sets of FMEA's for use by the application programs as long as the application programs adhere to the architecture of the present invention so that file system utilities and other FMEA applications (and methods) may support them.

Searching For Directory Entries Using The Present Invention

In accordance with one aspect of the present invention, the FMEA architecture permits a system administrator to search record names and/or other data fields, for example name filed 346 for the various FMEA structures. Alternatively, it may be desirable to include an additional field (not shown) within header portion 210A (see FIG. 3) relating to the title of a particular FMEA structure. In this way, an additional searching tool may be provided, allowing yet further flexibility in naming extended attributes or groups of extended attributes to the application programmer. Indeed, yet another field may be advantageously added to header portion 210A which includes the name of the FMEA database which comprises one or more FMEA structures. Even though the addition of additional search keys would provide further flexibility to a network administrator in terms of managing files, it need not impose additional burdens on the programmer; if the programmer elects not to employ the FMEA structure and/or FMEA database names, he may simply omit them without loss of performance.

For example, if a particular FMEA structure is created to manage extended attributes related to a world processing file, it may be appropriate to create a title for the FMEA structure relating to word processing, for example the title "WORD PROCESSING". Each record within the "WORD PROCESSING" FMEA structure may then have its own name which may be logically related to the general theme of word processing. In particular, it may be desirable for a record to comprise data pertaining to the author of a word processing document, such that the name of that particular record might be "author". Alternatively, it may be preferable to propose a standard whereby the names of the various records or, alternatively, the names of the FMEA structures correspond or otherwise relate to the title of the application program which created the FMEA structure, for example "WordPerfect"®, or the like.

It can thus be seen that virtually any system for organizing extended attributes may be employed in the context of the proposed FMEA architecture.

Figure 5:
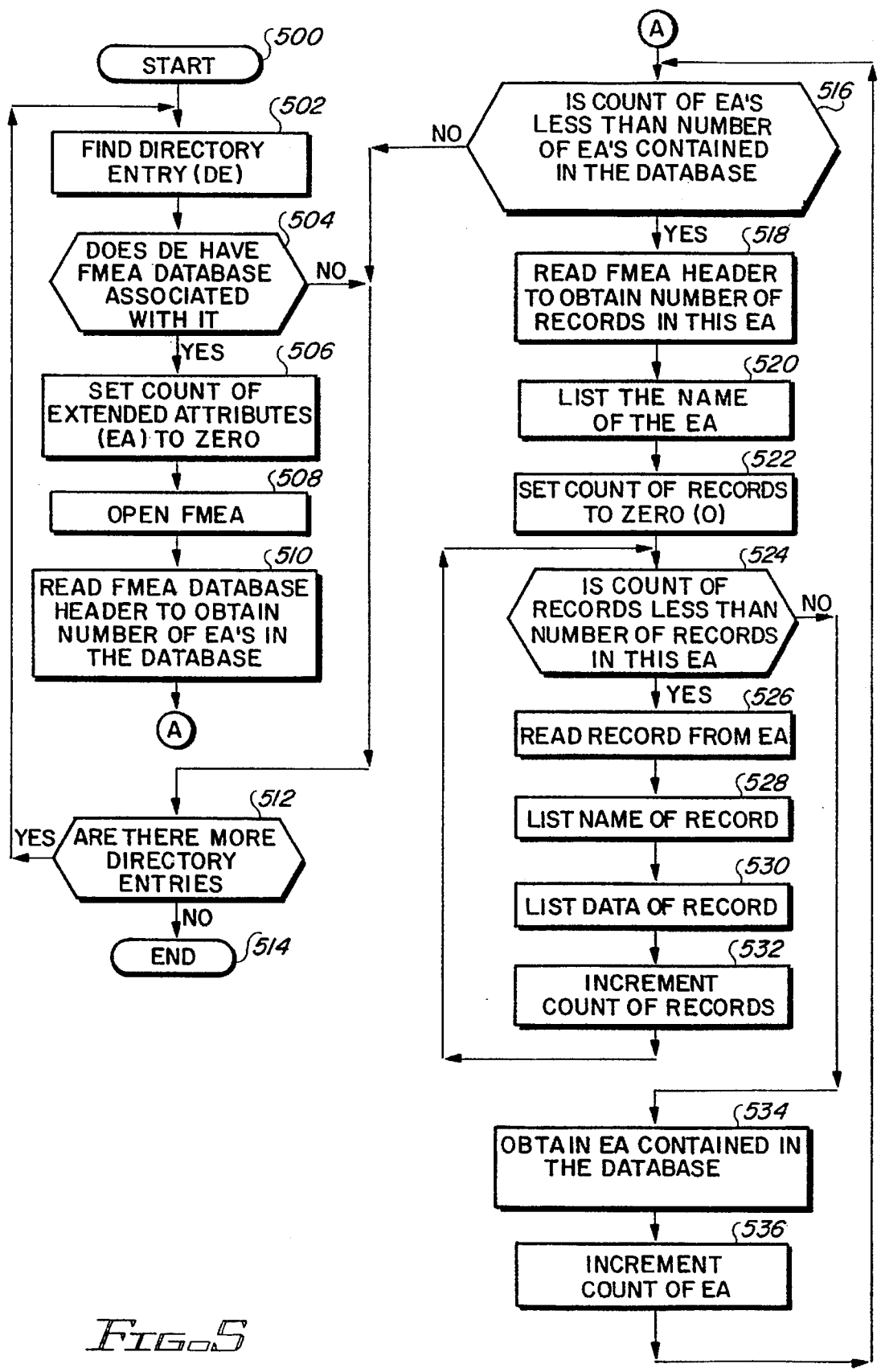

FIG. 5 is a flow diagram illustrating a method of searching for a directory entry (entries) that may contain an FMEA database associated with it. It further illustrates a method of reading each record in the FMEA database and outputting the names and data of the records to the user. FIG. 5 is provided by way of example to illustrate data flow using the definition, format, and structure of extended attributes for managing, maintaining, and controlling file systems according to the present invention. Execution begins at step 500. In step 502, a directory entry (DE) is found (e.g., DE 110A–110D). In decision block 504, a check is made to determine if the directory entry has an FMEA database associated with it. In the preferred embodiment of the present invention, this check is accomplished by looking at the starting substring of the name of the extended attribute to determine if it contains "FMEA". If the name of the extended attribute begins with "FMEA", the extended attribute is assumed to contain an FMEA database. Thus, when decision block 504 returns false (no), execution continues at decision block 512. In decision block 512, a check is made to determine if there are more directory entries in the file system (e.g., file system 104). When decision block 512 returns false (no), execution continues at step 514. In step 514, execution terminates. When decision block 512 returns true (yes), execution continues at step 502. When decision block 504 returns true (yes), execution continues at step 506.

In step 506, a count of extended attributes is set to zero. In step 508, an FMEA of the directory entry is opened (e.g., extended attribute 120 of DE 110C in FIG. 1). In step 510, the FMEA database header is read to obtain the number of extended attributes in the database (e.g., field 316 of header 210A shown in FIG. 4). In step 516, a check is made to determine if the count of extended attributes is less than the number of extended attributes in the FMEA database. When decision block 516 returns false (no), execution continues at decision block 512 (described above). When decision block 516 returns true (yes), execution continues at step 518.

In step 518, the FMEA header is read to obtain the number of records in the particular extended attribute (i.e., field 318 of header 210A shown in FIGS. 3 and 4). In step 520, the name of the extended attribute is output to the user. In step 522, a count of records is set to zero. In decision block 524, a check is made to determine if the count of records is less than the number of records in the extended attribute. When decision block 524 returns false (no), execution continues at step 534. In step 534, another extended attribute (FMEA) containing the FMEA database is obtained. In step 536, the count of extended attributes is incremented. Execution continues at decision block 516. When decision 524 returns true (yes), execution continues at step 526.

In step 526, a record of the extended attribute (e.g., record 2 of extended attribute 210 shown in FIG. 3) is read. In step 528, the name of the record (i.e., field 346 shown in FIGS. 3 and 4) are output. In step 530, the data of the record (i.e., field 348 shown in FIGS. 3 and 4) is output to the user. It should be apparent to a person skilled in the art that the name 346 and/or data 348 of the record may require interpretation or other processing. In step 532, the count of records is incremented. Execution continues at decision block 524.

In this manner, a method for providing a definition, format, and structure of extended attributes for managing, maintaining, and controlling file systems is disclosed.

While the invention has been described with reference to certain preferred embodiments, it will be appreciated that various substitutions, changes, modifications, omissions, and enhancements may be made without departing from the spirit thereof. Accordingly, it is intended that the scope of the present invention not be limited by such a description but be fully coextensive with the broadest interpretation allowable for the appended claims.

I claim:

1. A method of searching entries corresponding to files in a directory table maintained on a computer network, comprising the steps of:

providing a directory table, comprising a plurality of directory entries, each directory entry having a field corresponding to the location of EA data;

providing a first directory entry having an EA field corresponding to a first location in memory, wherein said first location includes extended attribute information which is compliant with FMEA architecture;

providing a second directory entry having an EA field corresponding to a second location in memory, wherein said second location comprises EA data which is non-FMEA compliant;

searching the EA field associated with a plurality of directory entries in said directory entry table, including said first directory and said second directory entry;

interrogating said first location in memory and said second location in memory; and identifying said first directory entry as having EA data associated therewith which is FMEA compliant based on the results of said searching steps.

2. The method of claim 1, further comprising the step of displaying said first directory entry data and data corresponding to said FMEA compliant EA.

3. The method of claim 1, wherein:

said step of providing said first directory entry comprises the step of providing an FMEA structure having an FMEA name field associated therewith.

4. The method of claim 3, wherein said FMEA name field includes indicia of the characters "FMEA".

5. A file management system of the type comprising a directory table having a plurality of directory entries associated therewith corresponding to respective files, and a storage facility for storing data files corresponding to said directory entries, wherein:

said directory entry table comprises a first directory entry having first extended attribute data associated therewith, wherein said first extended attribute data is constructed in accordance with a first application program;

a second directory entry having associated therewith second extended attribute data created by a second application which is distinguishable from said first application;

wherein said first extended attribute data and said second extended attribute data each exhibit respective first and second designations;

wherein said first designation includes indicia of FMEA compliance and a first unique descripter, and said second designation comprises indicia of FMEA compliance and a second unique descripter.

6. The system of claim 5, wherein said first and second designations are configured to be searchable by said file system using a single search key.

7. A file management system for a computer system, comprising:

a directory entry table having a plurality of directory entries associated therewith, wherein a first directory entry comprises indicia related to extended attributes; and an FMEA structure which embodies said extended attributes, comprising:
an identifying characteristic which identifies said FMEA structure as being FMEA compliant; and
a first field indicative of the number of FMEA structures associated with said first directory entry.

8. The system of claim 1, wherein:

said directory table further comprises a second directory entry comprising a second indicia of a second FMEA structure, wherein said first FMEA structure and said second FMEA structures are created from respective distinguishable applications, and wherein each of said first and said second FMEA structures include indicia of the total number of FMEA structures associated with said first directory entry and said second directory entry, respectively.

9. The system of claim 7, wherein:

said directory entry table further comprises a third directory entry having associated therewith a third FMEA structure, wherein said first FMEA structure was created using a first application during a first session, and wherein said third FMEA structure was created using said first application during a third session remote in time from said first session.

10. The system of claim 7, wherein:

said first directory entry further comprises a fourth FMEA structure associated therewith, wherein said first FMEA structure was created by a first application during a first session, and said fourth FMEA structure was created during a second session.

11. The system of claim 10, wherein said second FMEA structure was produced from a second application distinguishable from said first application.

12. A method for managing files in a computer database, comprising the steps of:

(a) creating a directory entry in a directory entry table associated with a file;

(b) storing information relating to at least one extended attribute of said file in a first FMEA structure;

(c) providing the value of 1 in a first field associated with said first FMEA structure, and terminating a first operating session;

(d) thereafter commencing a second operating session and accessing said first file;

(e) creating a second FMEA structure, relating to said first file during said second session, such that said second FMEA structure comprises a first field having a value of 2; and (f) subsequent to said step (d), changing first field value in said first FMEA structure from 1 to 2 upon completion of said second FMEA structure.

13. A method of searching directory entries in a directory table, comprising the steps of:

providing a directory table including a plurality of directory entries, including a first directory entry having associated therewith a first FMEA structure created from a first application, and a second directory entry having a second FMEA structure produced from a second application distinguishable from said first application;

successively searching all directory entries in said directory entry table, and identifying a first group of directory entries based on a first characteristic of said directory entries, said first characteristic being related to FMEA compliance; and searching said first group and isolating therefrom a second group having a common record name within the respective FMEA structures associated with each directory entry.

* * * * *